US006826269B2

United States Patent
Afana

(10) Patent No.: US 6,826,269 B2
(45) Date of Patent: Nov. 30, 2004

(54) PROFESSIONAL SERVICES BILLING PERSONAL IDENTIFICATION NUMBER

(75) Inventor: Marwan Monir Afana, Garland, TX (US)

(73) Assignee: MCI, Inc., Ashburn, VA (US)

( * ) Notice: Subject to any disclaimer, the term of this patent is extended or adjusted under 35 U.S.C. 154(b) by 108 days.

(21) Appl. No.: 09/750,619

(22) Filed: Nov. 30, 2000

(65) Prior Publication Data

US 2002/0064261 A1 May 30, 2002

(51) Int. Cl.⁷ .............................................. H04M 15/00
(52) U.S. Cl. .............................. 379/114.2; 379/114.05; 379/114.1; 379/114.15; 379/114.17; 379/114.2; 379/144.01
(58) Field of Search ........................ 379/111–119, 120, 379/121.01–121.04, 126–127.05, 133–134, 144.01, 145

(56) References Cited

U.S. PATENT DOCUMENTS

| | | | |
|---|---|---|---|
| 5,146,491 A | * 9/1992 | Silver et al. | |
| 5,392,343 A | 2/1995 | Davitt et al. | |
| 5,408,519 A | * 4/1995 | Pierce et al. | |
| 5,960,069 A | 9/1999 | Felger | |
| 5,991,380 A | * 11/1999 | Bruno et al. | |
| 6,070,067 A | * 5/2000 | Nguyen et al. | |
| 6,122,352 A | * 9/2000 | Kangas et al. | 379/114.29 |
| 6,137,872 A | * 10/2000 | Davitt et al. | |
| 6,246,755 B1 | * 6/2001 | Walker et al. | |
| 6,282,276 B1 | * 8/2001 | Felger | |

* cited by examiner

Primary Examiner—Duc Nguyen

(57) ABSTRACT

A system, and methods for billing clients of services providers are presented. Calls to the services providers are received at a prepaid calling center where the clients are prompted to provide an identification number. The identification number is then used to retrieve a record from a database which includes the client's debit account information as well as a menu of services available from a services provider, and the services provider's telephone number. After retrieving the foregoing information, the prepaid calling center completes a telephone call between the client and the services provider. The prepaid calling centers then debits the prepaid account at a prescribed billing rate until the telephone call is terminated.

27 Claims, 3 Drawing Sheets

| PIN | CLIENT SERVICE PHONE | CLIENT | PROFESSIONAL SERVICES PROVIDER | MENU OF SERVICES | SCHEDULE OF RATES | BALANCE | CHARGES |
|---|---|---|---|---|---|---|---|
| | | | | | | | |
| | | | | | | | |
| ...... | | | | | | | ...... |
| | | | | | | | |
| | | | | | | | |

PROFESSIONAL SERVICES BILLING PERSONAL IDENTIFICATION NUMBER

FIELD

The present application relates to telephone networks and more specifically to billing for professional services provided over the telephone.

BACKGROUND

Large and small professional services firms such as accounting, law, and consulting often provide professional services over the telephone line for a time based fee. This time based fee is separate from any toll charges associated with the phone call. The time based fee is also quite substantial, often ranging from several hundred dollars to several thousand dollars per hour. Thus keeping timely, and exact records of the charges for the client is essential.

Logs of client phone calls and the length of the conversation are often logged by keeping handwritten notes. This is disadvantageous for several reasons. Keeping a handwritten log is both time consuming and requires exceptional organization skills. The time expended maintaining a handwritten log, alone, results in a loss of revenue from the rendering of professional services. Additionally, even the most organized professional is prone to forget, or otherwise lose a record of a phone conversation from time to time. The failure to make a record of any phone conversation results in a loss of revenue, therefrom.

Additionally, some professionals, such as technical support staff, primarily generate revenue assisting customers by answering brief questions. These professionals can generate a large number of bills in short amount of time. The large number of bills results in greater overhead expended for accounting and billing.

Furthermore, precisely recording the length of each phone conversation is difficult, causing most service providers to estimate the time of the call. Where services are rendered at a high hourly billing rate, the discrepancy between the estimated and actual time can result in significant undercharges and overcharges. The discrepancy between the estimated and actual time can also cause honest disputes between the service provider and the client.

Professional services firms often lose revenue because of unpaid accounts. To prevent this, clients are often asked to prepay for the services rendered. However, where services are rendered over the telecommunications network, clients are often unable to verify the reputation of the professional services firm. As a result, customers who prepay are vulnerable to being defrauded by a small number of unscrupulous businesses.

Accordingly, it would be advantageous if there were a scheme for billing professional services which would alleviate these problems.

SUMMARY

A system, and methods for billing a client for charges payable to a service provider are presented. An incoming call is received from the calling party at a prepaid calling center and the client is prompted for an identification number. The prepaid calling center then establishes a voice connection between the client and the service provider and debits the client's prepaid account for the charges payable to the called party.

A prepaid calling system for billing clients is also presented. The prepaid calling system includes a central office for receiving an incoming call from the client, a voice unit for prompting the client for an identification number, a call processor for causing the central office to establish a phone call between the client and the services provider, and a database for storing a prepaid account for the client.

A method is also presented for collecting payments for services rendered by services providers. The method includes receiving prepayments from clients and holding the prepayments in trust in prepaid accounts. Phone conversations between the clients and the services providers are then monitored and charges for services associated with the phone conversations are debited to the prepaid accounts and disbursed to the services providers.

BRIEF DESCRIPTION OF THE DRAWINGS

Additional objectives and advantages will become more apparent and embodiments will be best understood by reference to the following description taken in conjunction with the accompanying drawings, wherein:

FIG. 3 is a block diagram of a prepaid calling database; and

DETAILED DESCRIPTION

Figure 1:
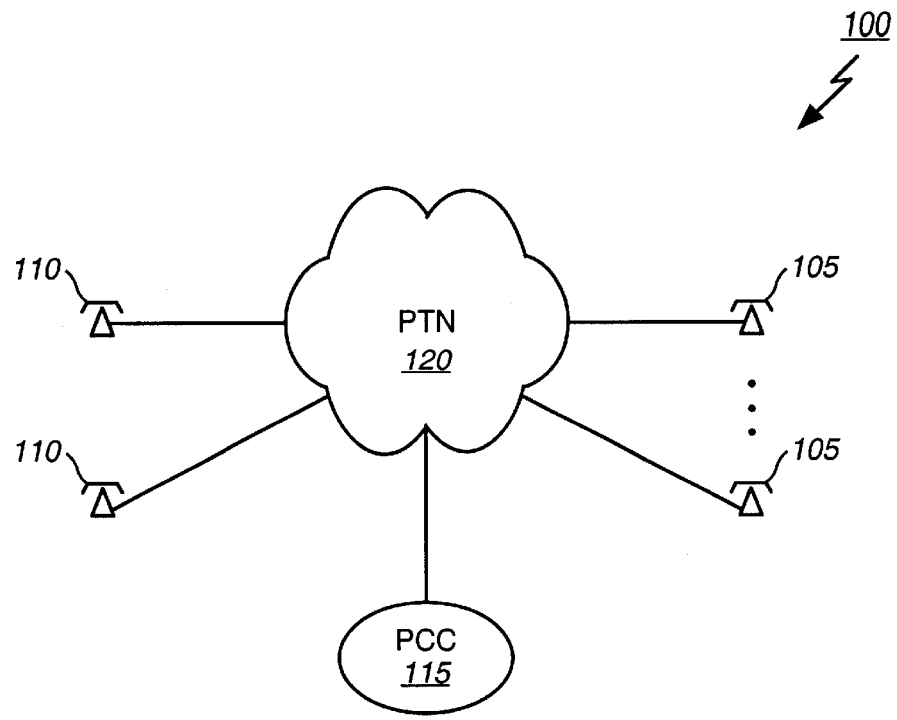
FIG. 1 is a block diagram of telecommunications system for facilitating professional services billing.

Referring now to FIG. 1, there is illustrated a block diagram of telecommunications system 100 for facilitating professional services billing. The telecommunications system 100 includes any number of clients/client telephones 105, any number of professional services providers/ professional services provider telephones 110, and a Prepaid Calling Center (PCC) 115. The professional services provider telephones 110 are associated with providers of professional services that charge clients a fee in exchange for advice, consulting services, or the like during a telephone call over the public telephone network (PTN) 120 between the professional services provider's telephone 110 and the client's telephone 105. This fee is separate from the toll charges associated with the phone call.

The PTN 120 is a network of central offices and tandem switches (not shown) forming the backbone of the telecommunications network. The network of central offices and tandem switches together route phone calls from calling telephone terminals, e.g., client telephone 105 to called telephone terminals, e.g., professional services provider's telephone 110. Because the routing of phone calls from a calling telephone to a called telephone is well known in the art, a detailed discussion is omitted.

Each of the professional services providers 110 are associated with any number of client service telephone numbers, such as toll-free telephone numbers, dialable at the client's telephone 105. Outgoing calls dialed to any one of the client service telephone numbers are routed by the PTN 120 to the PCC 115. When the outgoing call from the client telephone 105 is routed to the PCC 115, the PCC 115 establishes the identity of the calling party at the client telephone 105, guides the caller through a menu of available services, verifies billing information, completes a voice connection from the client telephone terminal 105 to the professional services provider telephone 110, and bills the caller.

The identity of the party at the client telephone 105 can be established by means of a personal identification number (PIN) and the billing arrangements can be established by means of an account with a prepaid credit. The client telephone 105 can establish a prepaid account with the PPC 115 with a credit, against which charges incurred during phone calls to professional service provider telephone 110 are deducted. Those skilled in the art will recognize that initial, and replenishing credits can be arranged by use of credit cards, debit cards, or other payment systems.

The PCC 115 can be operated by an entity that is separate from, and which can serve any number of the professional services providers 110. The PCC 115 operator can then sell cards with client service telephone numbers and PINs to professional services providers 110. The professional services providers 110 can then distribute the cards to their clients 105.

Figure 2:
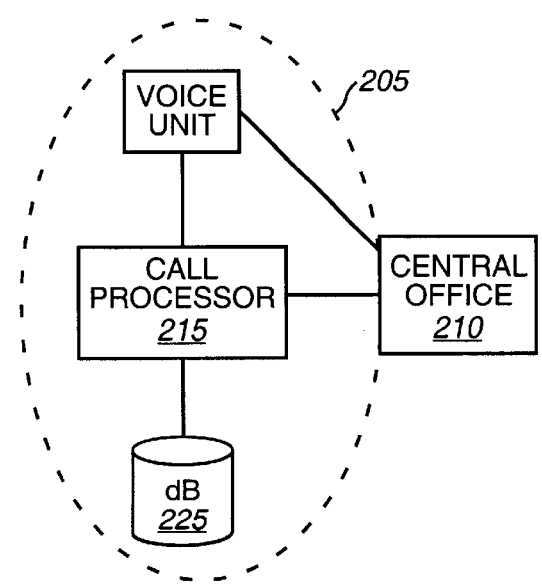
FIG. 2 is a block diagram of a prepaid calling center.

Referring now to FIG. 2, there is illustrated block diagram of a PCC 115. The PCC 115 comprises an Advanced Intelligent Network (AIN) 205 overlay of a central office 210. The central office 210 is a switch capable of establishing a voice connection between the client 105 and the professional services provider 110 by interconnecting a first leg from the client 105 to the PCC 115 to a second leg from the PCC 115 to the professional services provider 110. The AIN 205 overlay provides the "intelligence" which causes the PCC 115 to establish the identity of the caller, and set up the billing arrangements for the call.

The AIN 205 includes a call processor 215, a voice unit 220, and a prepaid client database 225. The call processor 215 can comprise a hardware platform, such as central processing unit (CPU), which executes a series of instructions which causes the call processor 215 to operate as will be described below. The series of instructions executed by the call processor 215 can be provided thereto, by means of storage on a computer readable medium such as read-only memory (ROM), random access memory (RAM), or removable, portable memory such as a floppy disc, or a compact disc. Alternatively, the call processor 215 may be implemented on an application specific integrated circuit (ASIC).

The voice unit 220 synthesizes voice messages audible at the client telephone 105. The voice messages are used to obtain inputs from and provide outputs to the caller. Inputs from the caller can be received by means of dual-tone multifrequency signals associated with the buttons on the client's telephone 105 which are receievened by a DTMF decoder which can be integrated with the call processor 215. Frequently played digitized messages such as a prompt to the caller to provide the PIN can be stored at the voice unit 220. Other more specific voice messages can be stored at the prepaid client database 225 and provided to the voice unit 220 by the call processor 215.

The database 225 stores information pertaining to each client account in the form of records. The records are retrievable by the call processor 215 to connect the incoming call to the professional services provider 110, and bill the client 105 for services rendered in connection with the incoming call. The records can also store a menu of available services to guide the caller to select a particular service from the preferred services provider in the form of digitized messages.

Referring now to FIG. 3, there is illustrated a block diagram of the database 225. The database 225 contains a plurality of records 305 which associate information pertaining to each PIN. Each record 305 includes a plurality of fields 310, wherein there is stored the PIN 310a, the client services phone number 310b associated with the PIN, the identity of the client 310c, the identity of the professional services provider 310d, a menu of services available to the client 310e, a schedule of rates 310f per unit of time for each of the services available in the menu of services, the client's prepaid balance 310g, and accrued charges 310h owed the professional services provider 110.

The menu of services 310e includes an interactive digitized recording of a list of services which are available to the client associated with the record 310. It is noted that professional services providers 110 often provide a number of different services, each of which are handled by different persons or departments. Each of these services is associated with a particular one of the rate of charges in the schedule of rates field 310f. The menu of services 310e also include call completion commands corresponding to each of the listed services. The call completion commands are used to establish a voice connection with a specific professional services provider telephone 110 which is associated with a person or department which can provide the service corresponding therewith.

For example, a large law firm may have attorneys specializing in estate planning, tax law, and employee benefits administration. A typical menu of services field 310e may list estate planning, tax, and employee benefits services, and include a prompt to the user to select a particular one of the services. The estate planning service can be associated with instructions for placing a phone call to an attorney 110 at the law firm who specializes in estate planning, while the tax service can be associated with instructions for placing a phone call to an attorney 110 at the law firm who specializes in tax, and the employee benefits administration service can be associated with the instructions for placing a phone call to an attorney 110 at the law firm who specializes in employee benefits administration. The schedule of rates 310f may include one billing rate for estate planning services, a second billing rate for tax services, and a third billing rate for employee benefits. Of course, the foregoing is not limited to the legal industry, and can be used in many other examples such as, but not limited to, a consulting firm, accounting firm, or even a doctor's office.

The records 305 in the database 225 are selectively retrievable by the call processing unit 215 during an incoming call. The call processing unit 215 uses the information therein to assist the user in selecting a particular professional service, direct the central office 210 to establish a voice connection with the desired professional services provider telephone 110, and appropriately charge the client 105, as described below.

Figure 4:
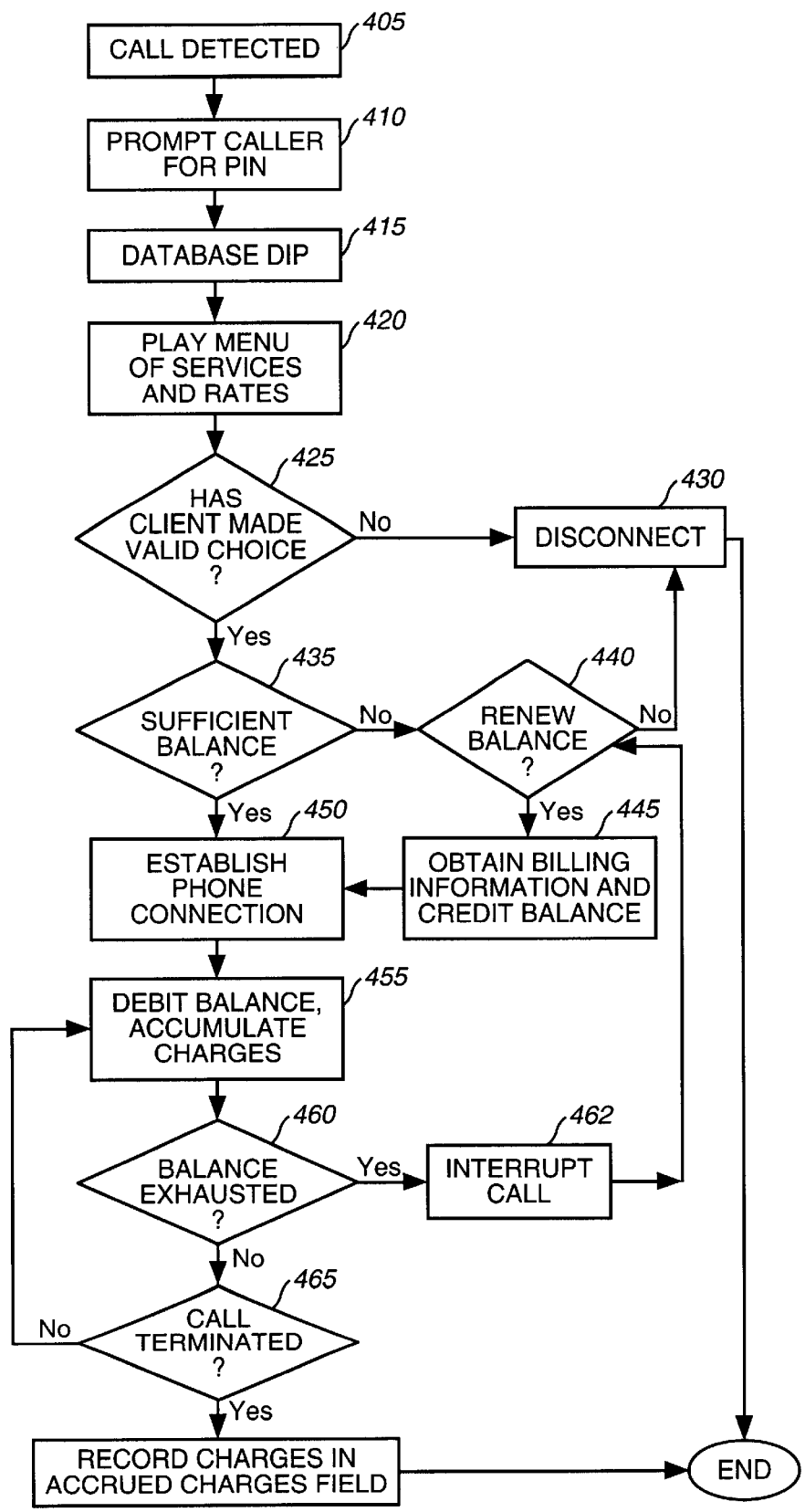
FIG. 4 is a flow diagram describing the operation of the call processor.

Referring now to FIG. 4, there is illustrated a flow diagram describing the operation of the PCC 120. An incoming call to a client services telephone number is routed by the PTN to the central office 210 of the PCC 120, and detected by the call processor 215 at step 405. The call processor 215 then causes the voice unit 220 to prompt the caller to provide their PIN (step 410) using DTMF signals generated by pressing the buttons on the client telephone 105. At step 415, the call processor 215 performs a database dip to retrieve the record 310 associated with the PIN received during step 410. The call processor 215 then causes the voice unit 220 to play a list of services available to the client 105 and the rates associated therewith (step 420) by forwarding the contents of the menu of services field 310e, and the schedule of rates field 310f to the voice unit 220. At step 425, the call processor 215 will determine whether the client 105 has validly chosen an available service from the menu of services and indicated a willingness to incur the billing rate transmitted during step 420.

Where the caller has not validly choosen an available service and indicated a willingness to incur the billing rate, the incoming call is disconnected (step 430), thereby terminating the foregoing process.

Where during step 425, the caller 105 selects a particular service and indicates a willingness to incur the associated billing rate, the call processor 215 verifies a sufficient balance (step 435) by making a comparison between the prepaid balance field 310g and a multiple of the rate for the selected service in the schedule of rates 310f. The foregoing comparison can include requesting the estimated length of the call from the caller and using the estimated length as the multiple to determine if the prepaid balance in the prepaid balance field 310g is sufficient.

If the caller does not have sufficient prepaid balance 310g during step 435, the call processor offers the caller a chance to renew their prepaid balance 310g (step 440). If the caller chooses to renew their balance, the call processor obtains billing information, such as credit card or debit card numbers, places a charge using the billing information, and credits the prepaid balance 310g (step 445). Those skilled in the art will recognize that the charge can be placed with the billing information provided by the caller by means of, for example, a data connection with a credit card clearinghouse or an electronic funds transfer clearinghouse. A connection to a credit card clearinghouse or an electronic funds transfer clearinghouse will also validate the billing information collected.

If during step 435, the caller has a sufficient prepaid balance or has renewed their prepaid balance during step 445, the call processor 210 commands the central office 210 to establish a voice connection to the professional services provider 110 by placing a phone call to the client services number 310b over the PSTN (step 450). After the caller is connected to the professional services provider during step 450, the PPC continuously debits the caller's prepaid balance field 310g and accumulates the charges in the accrued charges field 310h at the rate corresponding to the selected service in the schedule of rates 310f for the duration of the call (step 455) until the caller's prepaid balance is exhausted (step 460) or the call has been terminated (step 465). If the caller's prepaid balance 310g has been exhausted during step 460, the voice connection between the caller 105 and the professional services provider 110 is temporarily interrupted (step 462) and the caller is offered the opportunity to renew the prepaid balance 310g and steps 440–460 are repeated. When the call is terminated during step 465, the charges, time of the call, and the selected service from the menu of services is recorded in the accrued charges field 310h (step 370) and the process is completed.

The foregoing allows for provision of a unique service. Significant economies of scale are realized where the PCC 115 is used to serve a large number of professional services providers 110. Accordingly, a business entity can be established for operating the PCC 115 and providing billing services to professional services providers 110.

The business entity can sell prepaid cards with PINs to the professional services providers 110. The professional services providers 110 can then distribute or resell these cards to their clients 105, thereby setting up a prepaid account. An initial prepaid account balance can be collected in a number of ways. For example, the purchase price of the card can include an initial credit. Alternatively, the initial credit can be collected when the client 105 makes their first call to the professional services provider during steps 435–445.

The prepaid account balance stored in prepaid account balance field 310g can be held in trust for the client by the business entity operating the PCC 115. Calls to the professional services providers 110 can be facilitated as shown in FIG. 4, and accrued charges can be stored in the accrued charges field 310h. At regular periodic intervals, the accrued charges stored in the accrued charges field 310h can be paid to the professional services provider by the PCC 115 operator. A statement itemizing each of the accrued charges in the accrued charges field 310h can also be provided to both the client 105 and the professional services provider 110 at regular periodic intervals.

Although preferred embodiments of the present inventions have illustrated in the accompanying Drawings and described in the foregoing Detailed Description, it will be understood that the inventions are not limited to the embodiments disclosed, but are capable of numerous rearrangements, modifications and substitutions without departing from the spirit of the invention as set forth and defined by the following claims and equivalents thereof.

What is claimed is:

1. A method for billing of professional services, the method comprising:

verifying whether a calling party has a sufficient balance in a prepaid account based on an estimated length of a call to a called party associated with a provider of the professional services;

determining duration of the call, wherein the call corresponds to a selected one of the professional services; and debiting a prepaid account associated with the calling party for the charges payable to the provider.

2. The method of claim 1, further comprising:

retrieving a particular record storing a phone number associated with the called party and the prepaid account.

3. The method of claim 2, wherein the particular record is retrieved from a database storing a plurality of records, and at least one of the plurality of records stores another phone number.

4. The method of claim 2, wherein the particular record comprises a plurality of billing rates and wherein debiting the prepaid account further comprises debiting the prepaid account at a selected one of the plurality of billing rates.

5. The method of claim 4, wherein the plurality of billing rates are associated with the professional services.

6. The method of claim 1, further comprising:

receiving a prepayment from the calling party in response to determining that the calling party has an insufficient balance in the prepaid account; and crediting the prepayment to the prepaid account.

7. The method of claim 6, wherein receiving a prepayment further comprises receiving a credit card number from the calling party.

8. A prepaid calling system for billing of professional services, the system comprising:

a call processor for causing establishment of a voice connection between a calling party and a called party that provides the professional services, wherein the voice connection corresponds to a selected one of the professional services by the calling party; and a database for storing a prepaid account associated with the calling party, wherein the prepaid account is verified for a sufficient balance based on an estimated length of the voice connection, the prepaid account debitable for charges associated with the selected one of the professional services.

9. The prepaid calling system of claim 8, wherein the database stores a particular record, the particular record storing a phone number associated with the called party and the prepaid account, and wherein the call processor retrieves the particular record responsive to prompting the caller to provide an identification number by a voice unit.

10. The prepaid calling system of claim 9, wherein the database stores a plurality of records, and at least one of the plurality of records stores another phone number.

11. The prepaid calling system of claim 9, wherein the particular record comprises a plurality of billing rates and wherein the prepaid account is debited at a selected one of the plurality of billing rates.

12. The prepaid calling system of claim 11, wherein the plurality of billing rates are associated with the professional services.

13. A method for collecting payment for professional services, the method comprising:
   receiving respective prepayments from a plurality of clients to corresponding prepaid accounts;
   verifying whether the plurality of clients have sufficient balances in the prepaid accounts based on estimated lengths of phone calls with a plurality of providers of the professional services;
   monitoring phone calls between the plurality of clients and the plurality of providers, wherein the phone calls correspond to selected ones of the professional services by the respective clients;
   debiting charges in corresponding prepaid accounts for services to the plurality of clients based on the monitoring step; and
   disbursing payments for the services to the plurality of providers.

14. The method of claim 13, wherein the prepaid accounts are stored in a database.

15. The method of claim 14, wherein the monitoring comprises tracking duration of the phone calls, wherein the charges are based on the durations of the phone calls.

16. The method of claim 1, further comprising:
   prompting the calling party with a menu of the professional services.

17. The method of claim 16, wherein the menu in the prompting step includes call completion commands for establishing the call.

18. The method of claim 1, further comprising:
   prompting the calling party for an identification number, wherein the identification number is associated with the prepaid account.

19. The method of claim 1, further comprising:
   determining whether the prepaid account is exhausted; and
   terminating the call if the prepaid account is exhausted.

20. The method of claim 19, further comprising:
   prompting the calling party to replenish the prepaid account prior to the terminating step.

21. The method of claim 1, wherein the prepaid account includes payment by the calling party for the charges payable to the provider prior to establishing the call corresponding to the selected one of the professional services.

22. The method of claim 1, further comprising:
   establishing the pre-paid account for the calling party by receiving payment from the calling party to pay for at least a portion of the charges payable to the provider prior to establishing the call corresponding to the selected one of the professional services.

23. The method of claim 1, further comprising:
   disconnecting the call in response to determining that the selected one of the professional services is not a valid available service.

24. The prepaid calling system of claim 8, wherein the voice connection is disconnected in response to determining that the selected one of the professional services is not a valid available service.

25. The prepaid calling system of claim 8, wherein the call processor is configured for requesting the calling party to renew the prepaid balance in response to determining that the prepaid balance is insufficient.

26. The method of claim 13, further comprising:
   disconnecting the phone calls in response to determining that the selected ones of the professional services are not valid available services.

27. The method of claim 13, further comprising:
   receiving prepayments from the clients in response to determining that the clients have insufficient balances in prepaid accounts.

* * * * *